(12) United States Patent
Adams

(10) Patent No.: US 10,044,754 B2
(45) Date of Patent: *Aug. 7, 2018

(54) POLLUTING RESULTS OF VULNERABILITY SCANS

(71) Applicant: Juniper Networks, Inc., Sunnyvale, CA (US)

(72) Inventor: Kyle Adams, Brisbane, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/338,974

(22) Filed: Oct. 31, 2016

(65) Prior Publication Data

US 2017/0054753 A1    Feb. 23, 2017

Related U.S. Application Data

(63) Continuation of application No. 14/042,380, filed on Sep. 30, 2013, now Pat. No. 9,485,270.

(51) Int. Cl.
*G06F 11/00* (2006.01)
*H04L 29/06* (2006.01)
*G06F 21/55* (2013.01)

(52) U.S. Cl.
CPC ........ *H04L 63/1491* (2013.01); *G06F 21/554* (2013.01); *H04L 63/1433* (2013.01); *H04L 63/1441* (2013.01); *H04L 63/1466* (2013.01)

(58) Field of Classification Search
CPC ............. H04L 63/1491; H04L 63/1441; H04L 63/1433; H04L 63/1466; G06F 21/554
USPC ......................................................... 726/25
See application file for complete search history.

(56) References Cited

U.S. PATENT DOCUMENTS

| | | | |
|---|---|---|---|
| 7,630,406 B2 * | 12/2009 | Sood ....................... | H04L 63/14 370/394 |
| 7,908,656 B1 * | 3/2011 | Mu ...................... | G06F 21/6218 726/22 |
| 8,601,586 B1 * | 12/2013 | Boutros .............. | H04L 63/1433 709/217 |
| 9,485,270 B2 | 11/2016 | Adams | |

(Continued)

OTHER PUBLICATIONS

Omar Ismail, "Proposal and Implementation of Automatic Detection/Collection System for Cross-Site Scripting Vulnerability" Mar. 29, 2004, IEEE.*

(Continued)

*Primary Examiner* — Samson Lemma
(74) *Attorney, Agent, or Firm* — Harrity & Harrity, LLP

(57) ABSTRACT

A security device may receive, from a server device, a response to a request. The request may be provided by an attacker device and may include a plurality of input values. The security device may determine the plurality of input values, included in the request, based on receiving the response. The security device may modify the response to form a modified response. The response may be modified to include information associated with the plurality of input values. The response may be modified in an attempt to prevent the attacker device from identifying a vulnerability, associated with the server device, based on the plurality of input values being included in the response. The security device may provide the modified response to the attacker device.

20 Claims, 11 Drawing Sheets

(56) References Cited

U.S. PATENT DOCUMENTS

| | | | |
|---|---|---|---|
| 2006/0242704 A1* | 10/2006 | Aviani | G06F 21/554 726/23 |
| 2007/0136809 A1 | 6/2007 | Kim et al. | |
| 2008/0320567 A1 | 12/2008 | Shulman et al. | |
| 2010/0121903 A1 | 5/2010 | St. Pierre | |
| 2010/0121979 A1* | 5/2010 | St. Pierre | H04L 63/1491 709/239 |
| 2010/0281311 A1* | 11/2010 | Gao | H04L 63/168 714/49 |
| 2011/0214182 A1 | 9/2011 | Adams et al. | |
| 2011/0219446 A1* | 9/2011 | Ichnowski | H04L 63/1441 726/22 |
| 2011/0283359 A1* | 11/2011 | Prince | H04L 61/1511 726/23 |
| 2012/0023090 A1* | 1/2012 | Holloway | H04L 67/28 707/709 |
| 2012/0180128 A1* | 7/2012 | Amit | G06F 21/445 726/22 |
| 2014/0283069 A1* | 9/2014 | Call | H04L 63/1425 726/23 |
| 2014/0298469 A1* | 10/2014 | Marion | G06F 21/55 726/23 |
| 2014/0373087 A1* | 12/2014 | Ciu | H04L 63/145 726/1 |

OTHER PUBLICATIONS

European Search Report corresponding to EP 14 18 6506 dated Feb. 13, 2015, 6 pages.

Ismail et al., "A Proposal and Implementation of Automatic Detection/Collection System for Cross-Site Scripting Vulnerability," Proceedings of the 18$^{th}$ International Conference on Advanced Information Networking and Application (AINA '04), vol. 1, 2004, 7 pages.

Scott et al., "Abstracting Application-Level Web Security," WWW '02, Proceedings of the 11$^{th}$ International Conference on World Wide Web, May 7-11, 2002, pp. 396-407, 11 pages.

"HTML Code Injection and Cross-site scripting—Understanding the cause and effect of CSS (XSS) Vulnerabilities," www.technicalinfo.net/papers/CSS.html, printed on Sep. 11, 2013, 18 pages.

* cited by examiner

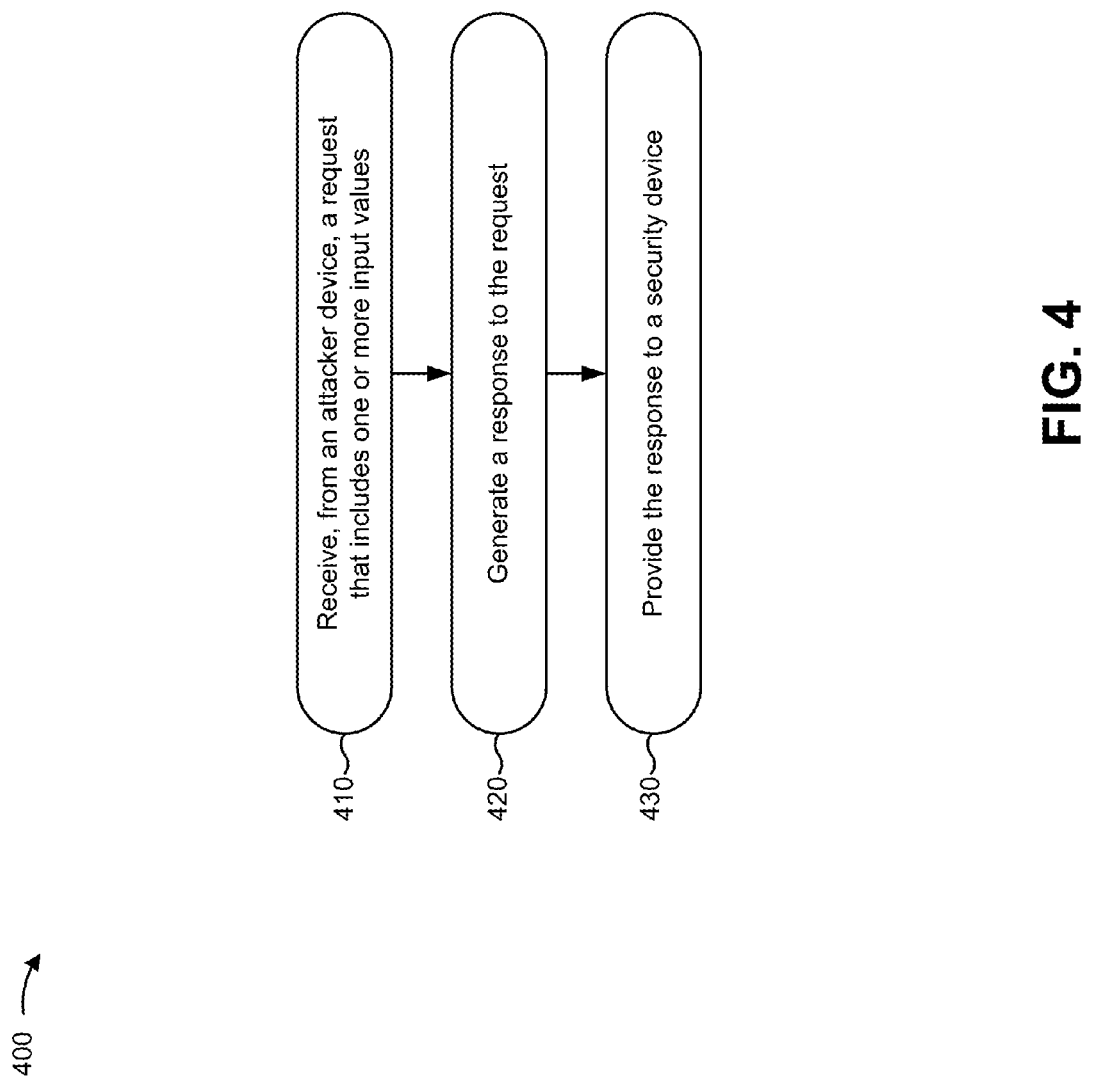

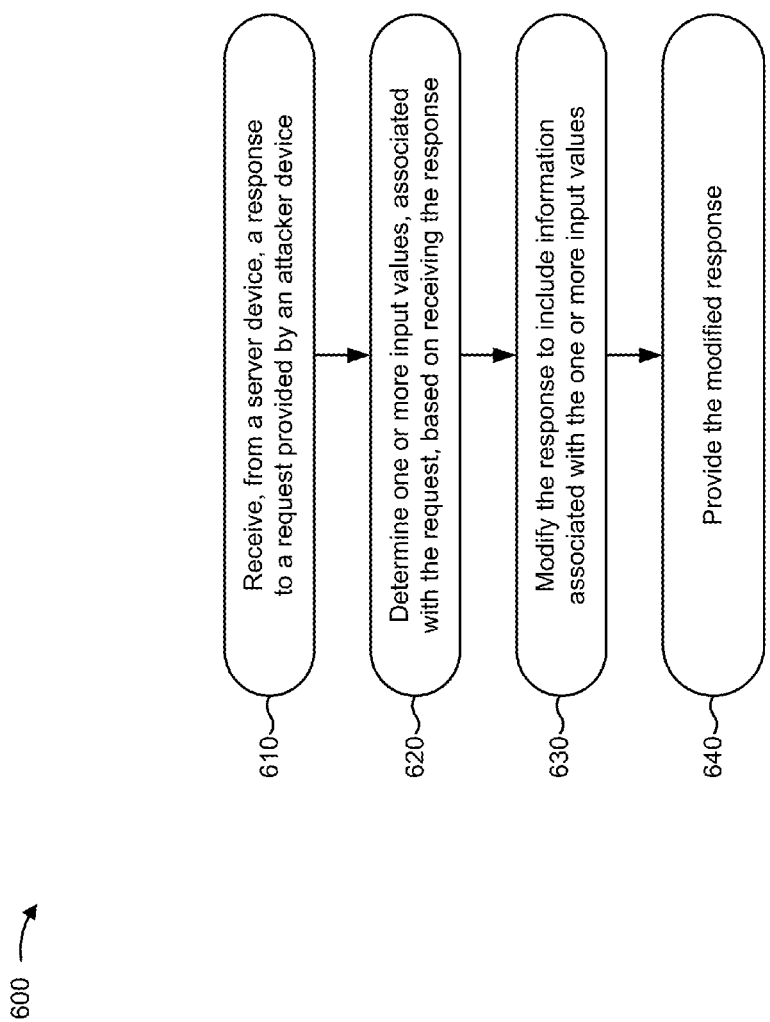

US 10,044,754 B2

POLLUTING RESULTS OF VULNERABILITY SCANS

RELATED APPLICATION

This application is a continuation of U.S. patent application Ser. No. 14/042,380, filed Sep. 30, 2013 (now U.S. Pat. No. 9,485,270), the disclosure of which is incorporated herein by reference.

BACKGROUND

A hacker may identify a vulnerability (e.g., a coding weakness, a security weakness, etc.) in an application, a program, a network, a system, or the like. The hacker may attempt to exploit the vulnerability (e.g., by embedding malicious content, by obtaining private information, etc.) after the weakness has been identified.

SUMMARY

According to some possible implementations, a security device may include one or more processors to: receive, from a server device, a response to a request, where the request may be provided by an attacker device and may include a plurality of input values; determine the plurality of input values, included in the request, based on receiving the response; modify the response to form a modified response, where the response may be modified to include information associated with the plurality of input values, and where the response may being modified in an attempt to prevent the attacker device from identifying a vulnerability, associated with the server device, based on the plurality of input values being included in the response; and provide the modified response to the attacker device.

According to some possible implementations, a computer-readable medium may store one or more instructions that, when executed by one or more processors, cause the one or more processors to: receive, from a server device, a response associated with a request provided by an attacker device, where the request may include a set of inputs; obtain information that identifies the set of inputs included in the request; modify the response to include information associated with a plurality of inputs in the set of inputs, where the response may be modified in an attempt to prevent an attacker device from receiving information that identifies a vulnerability, associated with the server device, based on the plurality of inputs in the set of inputs being included in the modified response; and provide the modified response to the attacker device.

According to some possible implementations, a method may include: receiving, by a security device, a response to a request, where the request may be provided to a server device by an attacker device and may include input values, where the input values may be provided by the attacker device, and where the response may be provided by the server device; determining, by the security device, the input values included in the request; modifying, by the security device, the response to include a plurality of the input values; and providing, by the security device, the modified response to attempt to cause the attacker device to be unable to identify a vulnerability, associated with the server device, based on the plurality of the input values being included in the response.

BRIEF DESCRIPTION OF THE DRAWINGS

FIG. 4 is a flow chart of an example process for receiving a request that includes one or more input values, and providing a response to the request;

FIG. 6 is a flow chart of an example process for modifying a response, associated with a request, to include information associated with each of one or more input values included in the request.

DETAILED DESCRIPTION

The following detailed description of example implementations refers to the accompanying drawings. The same reference numbers in different drawings may identify the same or similar elements.

A hacker may wish to identify a vulnerability (e.g., a cross site scripting ("XSS") vulnerability, a structured query language ("SQL") injection vulnerability, etc.) in an application (e.g., a web application) that may allow the hacker to engage in malicious activity (e.g., embedding malicious content, injecting code, etc.) for a malicious purpose (e.g., to obtain login information associated with another user, to obtain a session cookie associated with the other user, etc.).

One method that may allow the hacker to identify the vulnerability is to determine (e.g., using a vulnerability scanner, etc.) whether an input, associated with a request to a server device (e.g., a server device associated with the application), is reflected in a response generated by the server device (e.g., a reflected input may be indicative of a vulnerability in the application). Implementations described herein may allow a security device, associated with a server device, to modify a response to include information associated each of one or more input values provided by a hacker (e.g., via an attacker device). In this way, the security device may indicate a vulnerability associated with every input provided by the hacker, and the hacker may not easily identify an actual vulnerability (e.g., since the response will include one or more false positives associated with one or more of the input values).

Figure 1A:
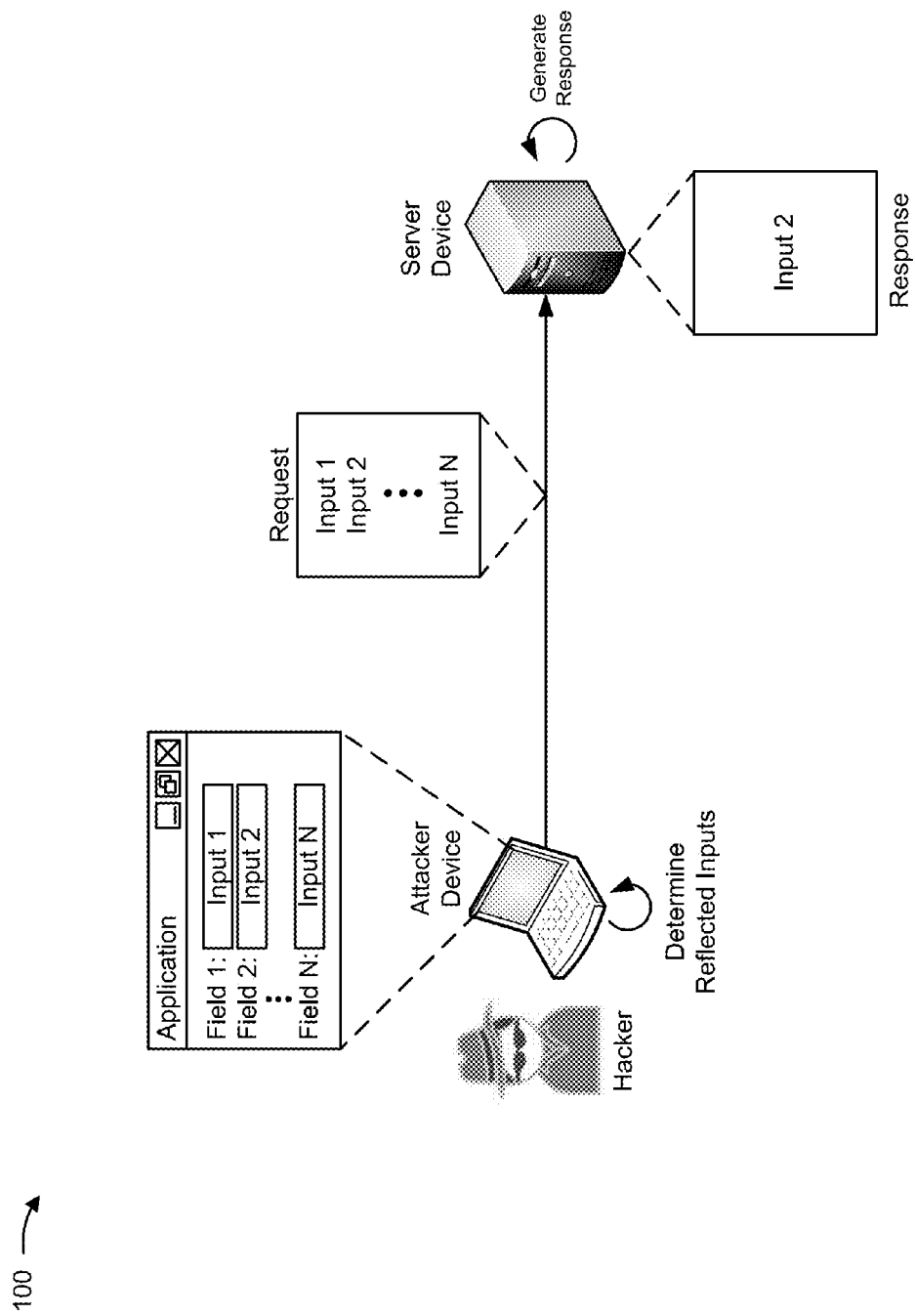
FIGS. 1A and 1B are diagrams of an overview of an example implementation described herein.
Figure 1B:
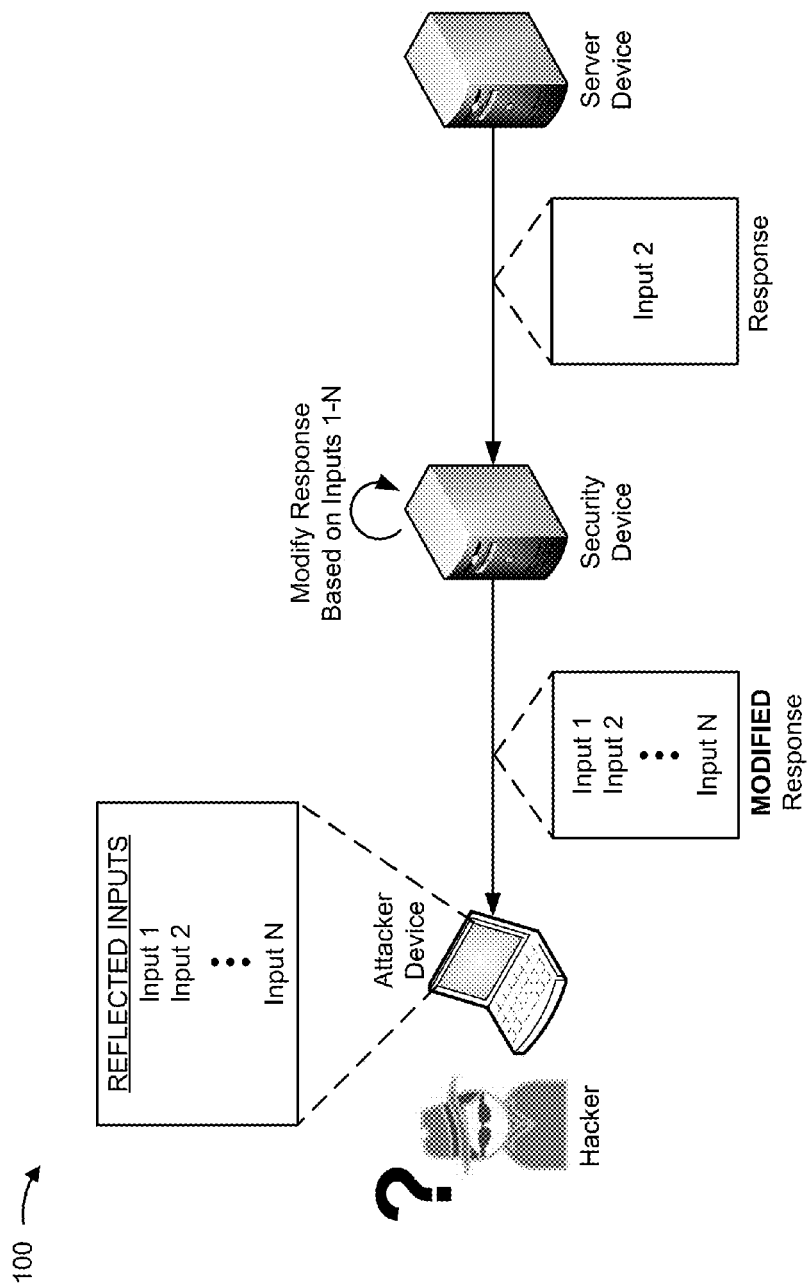

FIGS. 1A and 1B are diagrams of an overview of an example implementation 100 described herein. For the purposes of example implementation 100, assume that a hacker wishes to identify (e.g., using a vulnerability scanner executed on an attacker device) a vulnerability in an application hosted by a server device. As shown, assume that the hacker wishes to identify the vulnerability based on one or more input values associated with the application (e.g., a reflected input may indicate a vulnerability).

As shown in FIG. 1A, the attacker device may provide a quantity of input values (e.g., input 1 through input N (N>1)) associated with a quantity of fields (e.g., field 1 through field N). As further shown, the attacker device may send a request including information that identifies each of the N input values, and including other information associated with the request, (not shown) to the server device. As further shown, the server device may receive the request, and may generate a response to the request. As shown, the response may include information that identifies input 2 (e.g., input 2 is reflected in the response), and other information associated with the response (not shown).

As shown in FIG. 1B, the server device may provide the response (e.g., including the information that identifies input 2), to a security device (e.g., associated with the server device). As shown, the security device may determine (e.g., based on information received from the server device or information included in the request) information that identifies each of the N input values, and may modify the response based on the information that identifies each of the N input values (e.g., such that each of the N input values are reflected in the modified response).

As further shown, the security device may provide the modified response to the attacker device. As shown, the attacker device may provide (e.g., to the hacker) information that indicates that each of the N input values are reflected in the response. As shown, the hacker may be unable to identify a vulnerability associated with the server device (e.g., since the response includes false positives associated with one or more of the N input values).

In this way, a security device, associated with a server device, may modify a response, associated with a request provided by an attacker device, to include information that identifies one more input values included in the request. This may prevent a hacker, associated with the attacker device, from identifying a vulnerability associated with the server device.

Figure 2:
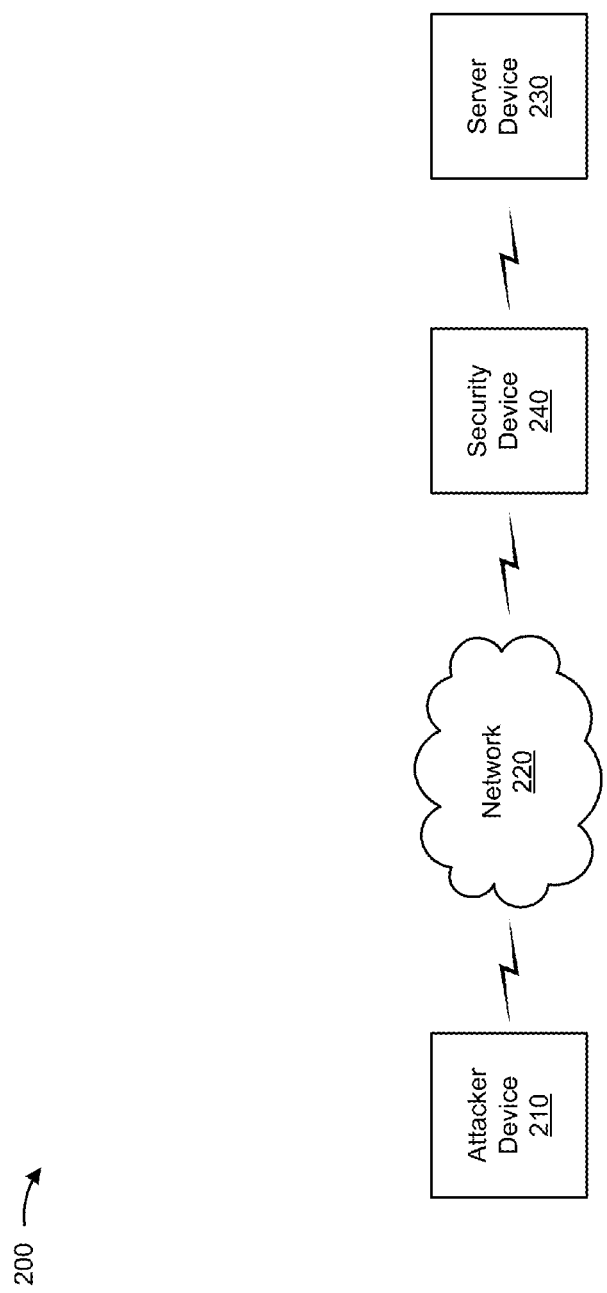
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include an attacker device 210, a network 220, a service device 230, and a security device 240.

Attacker device 210 may include one or more devices capable of communicating with other devices (e.g., server device 230) via a network (e.g., network 220), and/or capable of receiving information provided by another device (e.g., server device 230). For example, attacker device 210 may include a computing device, such as a laptop computer, a tablet computer, a handheld computer, a desktop computer, a mobile phone (e.g., a smart phone, a radiotelephone, etc.), a personal digital assistant, or a similar device. In some implementations, attacker device 210 may be capable of generating and sending (e.g., to server device 230) a request (e.g., a request associated with an application hosted by server device 230) and receiving a response associated with the request. Additionally, or alternatively, attacker device 210 may be capable of identifying (e.g., by executing a vulnerability scanner, etc.) a vulnerability associated with server device 230 (e.g., a vulnerability associated with an application hosted by server device 230, etc.).

Network 220 may include one or more wired and/or wireless networks. For example, network 220 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks. In some implementations, network 220 may allow communication between devices, such as attacker device 210, server device 230, and/or security device 240.

Server device 230 may include one or more devices capable of receiving, providing, generating, storing, and/or processing information received and/or provided via a network (e.g., network 220) and/or another device (e.g., security device 240). For example, server device 230 may include a computing device, such as a server (e.g., an application server, a content server, a host server, a web server, etc.). In some implementations, server device 230 may receive information from and/or provide information to attacker device 210 (e.g., via network 220 and/or security device 240). Additionally, or alternatively, server device 230 may be capable of generating a response to a request received from another device (e.g., attacker device 210).

Security device 240 may include one or more devices capable of receiving, providing, generating, storing, and/or processing information received and/or provided via a network (e.g., network 220) and/or another device (e.g., server device 230). For example, security device 240 may include a computing device, such as a server. In some implementations, security device 240 may receive information from and/or provide information to attacker device 210 (e.g., via network 220) and/or server device 230. Additionally, or alternatively, security device 240 may include one or more devices capable of processing and/or transferring communications (e.g., a request, a response, etc.) between attacker device 210 and server device 230. For example, security device 240 may include a network device, such as a reverse proxy, a server (e.g., a proxy server), a traffic transfer device, a firewall, a router, a load balancer, or the like.

In some implementations, security device 240 may be capable of determining one or more input values associated with a request provided by another device (e.g., attacker device 210). Additionally, or alternatively, security device 240 may be capable of modifying a response, associated with the request provided by another device (e.g., server device 230), based on the one or more input values associated with the request.

Security device 240 may be used in connection with a single server device 230 or a group of server devices 230 (e.g., a data center). Communications may be routed through security device 240 to reach the one or more server devices 230. For example, security device 240 may be positioned within a network as a gateway to a private network that includes one or more server devices 230.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
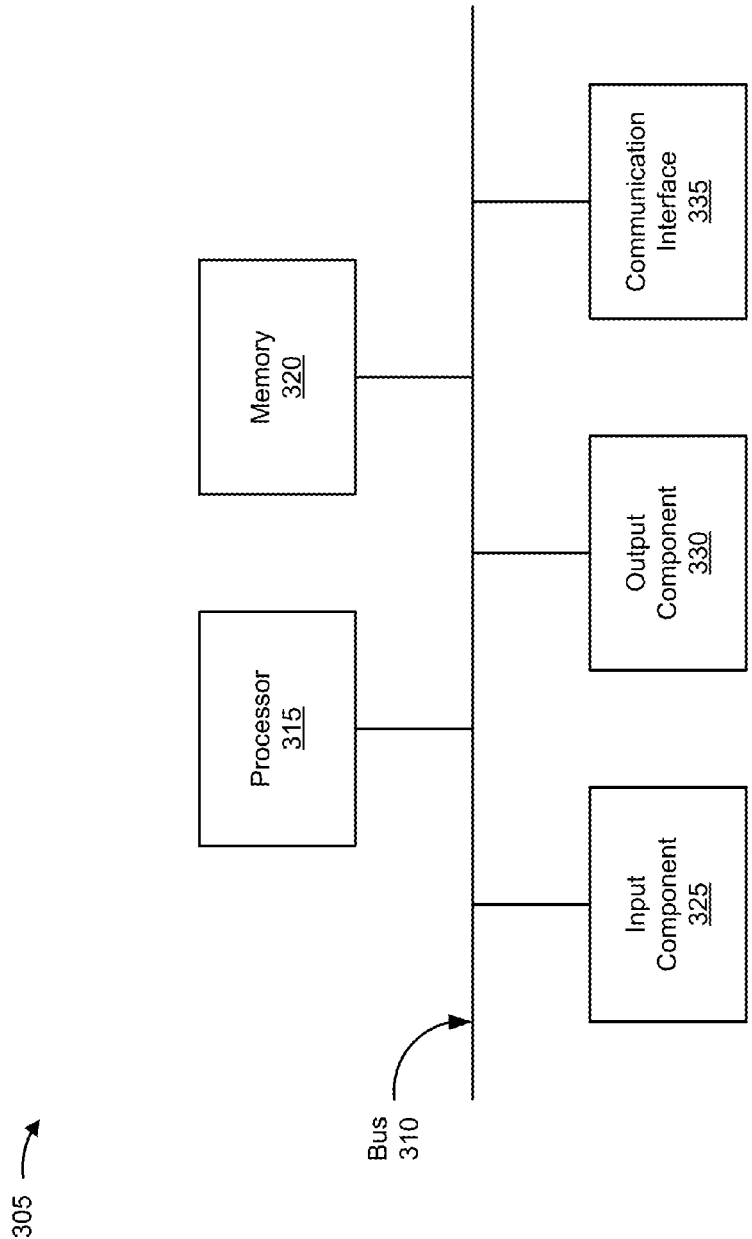
FIG. 3 is a diagram of example components of one or more devices of FIG. 2.

FIG. 3 is a diagram of example components of a device 300. Device 300 may correspond to attacker device 210, server device 230, and/or security device 240. Additionally, or alternatively, each of attacker device 210, server device 230, and/or security device 240 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

FIG. 4 is a flow chart of an example process 400 for receiving a request that includes one or more input values, and providing a response to the request. In some implementations, one or more process blocks of FIG. 4 may be performed by server device 230. In some implementations, one or more process blocks of FIG. 4 may be performed by another device or a group of devices separate from or including server device 230, such as security device 240.

As shown in FIG. 4, process 400 may include receiving, from an attacker device, a request that includes one or more input values (block 410). For example, server device 230 may receive, from attacker device 210, a request that includes one or more input values. In some implementations, server device 230 may receive the request from attacker device 210 when attacker device 210 sends the request via network 220. In some implementations, server device 230 may receive the request via another device (e.g., security device 240).

A request may include a message, sent from attacker device 210 to server device 230 (e.g., via security device 240 and/or network 220), associated with a resource (e.g., a HyperText Markup Language ("HTML") file, an image file, a video file, an audio file, etc.), associated with an application (e.g., a web application) that attacker device 210 wishes to receive from server device 230.

In some implementations, the request may include information that identifies one or more input values, provided by attacker device 210, associated with the resource that attacker device 210 wishes to receive from server device 230. For example, the request may include one or more input values (e.g., input values provided via one or more input fields included on a website), provided by attacker device 210, associated with an application (e.g., a web application) hosted by server device 230. In some implementations, attacker device 210 may provide the input values in an attempt to identify a vulnerability (e.g., an XSS vulnerability, an SQL injection vulnerability, a coding weakness, etc.) based on the resource provided by server device 230. For example, attacker device 210 may provide input values for one or more fields (e.g., included in a website), and may send, to server device 230, a request (e.g., a request to provide an HTML file) that includes the one or more input values. Attacker device 210 may determine whether a vulnerability (e.g., an XSS vulnerability) exists based on information, associated with the input values, included in a response to the request (e.g., an input value reflected in the response to the request may indicate that an XSS vulnerability exists). In some implementations, attacker device 210 may generate the input values included in the request (e.g., using a vulnerability scanner). Additionally, or alternatively, a user of attacker device 210 (e.g., a hacker) may provide the input values (e.g., via attacker device 210).

In some implementations, the request may include information that identifies attacker device 210 (e.g., a string of characters that identifies attacker device 210, a network address associated with attacker device 210, a port number associated with attacker device 210, etc.). Additionally, or alternatively, the request may include information that identifies server device 230 (e.g., a string of characters that identifies server device 230, a network address associated with server device 230, a port number associated with server device 230, information that identifies an application hosted by server device 230, etc.).

In some implementations, server device 230 may receive the request based on information included in the request. For example, server device 230 may receive the request based on a network address (e.g., that identifies server device 230) included in the request. As an additional example, server device 230 may receive the request based on information (e.g., a web address, a uniform resource locator ("URL"), etc.) associated with an application (e.g., a web application), hosted by server device 230, included in the request.

As further shown in FIG. 4, process 400 may include generating a response to the request (block 420). For example, server device 230 may generate a response to the request received from attacker device 210. In some implementations, server device 230 may generate the response when server device 230 receives the request from attacker device 210. Additionally, or alternatively, server device 230 may generate the response when server device 230 receives information, indicating that server device 230 may generate the response, from another device (e.g., security device 240).

The response may include a message, provided by server device 230, that includes a resource (e.g., an HTML file, an image file, a video file, an audio file, etc.) and/or other information requested by attacker device 210. For example, server device 230 may send a response to a request for an HTML file associated with a web application, hosted by server device 230, that includes the HTML file and/or other information associated with providing the HTML file to attacker device 210.

In some implementations, the response may include information associated with one or more input values associated with the request. For example, attacker device 210 may provide input values (e.g., via input fields included in a website), and server device 230 may generate a response (e.g., an HTML file associated with the website) that includes information that identifies one or more of the input values (e.g., the HTML file may reflect one or more of the input values, the HTML file may include information that identifies one or more of the input values, etc.), provided by attacker device 210.

In some implementations, the response may include information that identifies attacker device 210, such as a network address associated with attacker device 210, a port number associated with attacker device 210, or the like. Additionally, or alternatively, the response may include information that identifies server device 230, such as a network address associated with server device 230, a port number associated with server device 230, or the like. Additionally, or alternatively, the response may include other information associated with providing the resource identified in the request, to attacker device 210.

As further shown in FIG. 4, process 400 may include providing the response to a security device (block 430). For example, server device 230 may provide the response to security device 240. In some implementations, server device 230 may provide the response to security device 240 when server device 230 generates the response. Additionally, or alternatively, server device 230 may provide the response to security device 240 when server device receives information, indicating that server device 230 may provide the response, from another device (e.g., security device 240). In some implementations, server device 230 may provide the response to security device 240 via network 220.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

Figure 5A:
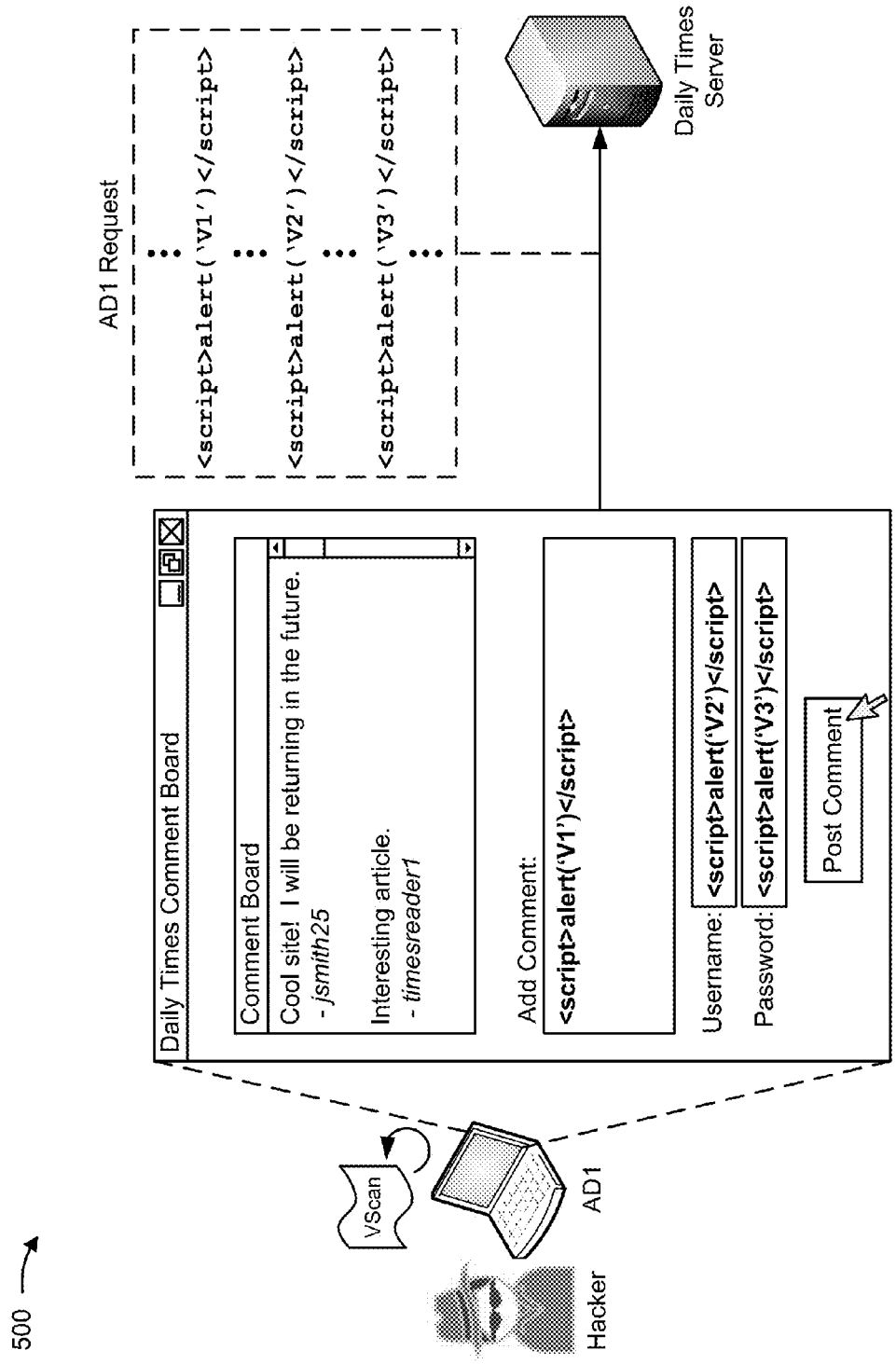
FIGS. 5A and 5B are diagrams of an example implementation relating to the example process shown in FIG. 4.
Figure 5B:
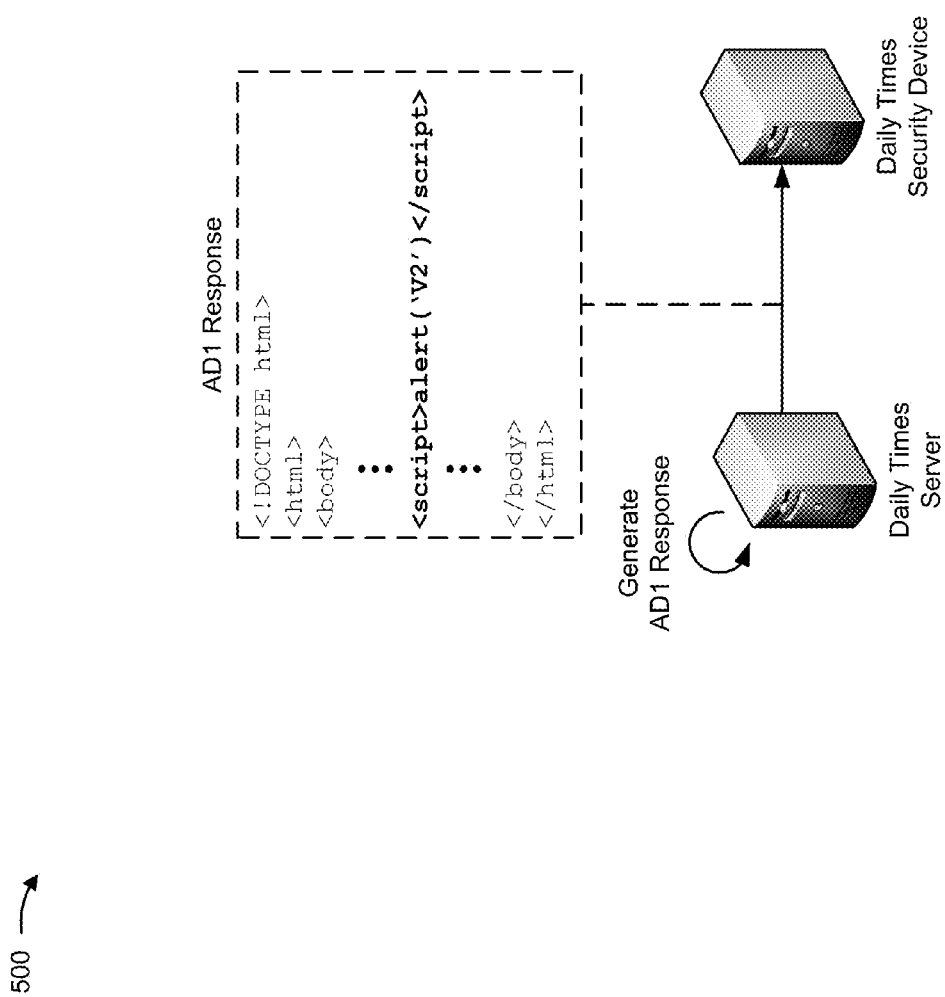

FIGS. 5A and 5B are diagrams of an example implementation 500 relating to example process 400 shown in FIG. 4. For the purposes of example implementation 500, assume that a hacker wishes to identify (e.g., via an attacker device, identified as AD1) a vulnerability included in a website associated with a Daily Times comment board. Further, assume that the attacker device is configured to execute a program (e.g., VScan) to identify vulnerabilities based on whether input values, associated with a request to a Daily Times server, are reflected in a response received from the Daily Times server.

As shown in FIG. 5A, AD1 may access a website associated with the Daily Times comment board (e.g., via the internet). As shown, the Daily Times comment board may include an input field associated with entering a comment (e.g., "Add Comment"), an input field associated with entering a username (e.g., "Username"), and an input field associated with entering a password (e.g., "Password"). As shown, AD1 may execute VScan, and VScan may cause AD1 to enter input values into the Add Comment field, the Username field, and the Password field. As shown, each of the input values (e.g., "<script>alert ('V1')</script>," "<script>alert ('V2')</script>," and "<script>alert ('V3')</script>") may include HTML code associated with running a script (e.g., VScan may identify an XSS vulnerability based on whether the HTML code is reflected in a response from the Daily Times server). As further shown, AD1 may send (e.g., by selecting a "Post Comment" button) a request (e.g., a request to receive an HTML file associated with posting a comment) to the Daily Times server. As shown, the request may include information that identifies the input value provide by AD1, and other information associated with the request (not shown).

As shown in FIG. 5B, the Daily Times server may generate a response that includes an HTML file, based on receiving the request from AD1. As shown, the response may include information associated with the HTML document generated by the Daily Times server, and may include information that identifies an input value (e.g., "<script>alert ('V2')</script>") included in the request. In other words, as shown, the response may reflect the input value entered by AD1 into the Username field (e.g., which may indicate a vulnerability associated with the Username field). As shown, the Daily Times server may provide the response to a Daily Times security device.

As indicated above, FIGS. 5A and 5B are provided merely as an example. Other examples are possible and may differ from what was described with regard to FIGS. 5A and 5B.

FIG. 6 is a flow chart of an example process 600 for modifying a response, associated with a request, to include information associated with each of one or more input values included in the request. In some implementations, one or more process blocks of FIG. 6 may be performed by security device 240. In some implementations, one or more process blocks of FIG. 6 may be performed by another device or a group of devices separate from or including security device 240, such as server device 230.

As shown in FIG. 6, process 400 may include receiving, from a server device, a response to a request provided by an attacker device (block 610). For example, security device 240 may receive, from server device 230, a response to a request (e.g., a request associated with a web application) provided by attacker device 210. In some implementations, security device 240 may receive the response when server device 230 sends the response. In some implementations, security device 240 may receive the response via network 220.

As further shown in FIG. 6, process 400 may include determining one or more input values, associated with the request, based on receiving the response (block 620). For example, security device 240 may determine one or more input values, associated with the request (e.g., the request provided by attacker device 210), based on receiving the response (e.g., from server device 230). In some implementations, security device 240 may determine the one or more input values associated with the request when security device 240 receives the response from server device 230. Additionally, or alternatively, security device 240 may determine the one or more input values when security device 240 receives information, indicating that security device 240 may modify the response based on the one or more input values, from another device (e.g., server device 230).

In some implementations, security device 240 may determine the one or more input values based on information included in the request. For example, security device 240 may receive the request from attacker device 210 (e.g., when security device 240 is positioned to receive the request and forward the request to server device 230), may store the one or more input values (e.g., in a memory location associated with security device 240), and may determine the input values (e.g., read the one or more input values from the memory location) when security device 240 receives the response from server device 230.

In some implementations, security device 240 may determine the one or more input values based on information included in the response generated by server device 230. For example, the response may include information that identifies the one or more input values associated with the request, and security device 240 may determine the one or more input values based on the information included in the response. In some implementations, the response may include the one or more input values provided by attacker device 210 (e.g., when the response reflects the input values as provided by attacker device 210), and security device 240 may determine the input values based on the input values included in the response. Additionally, or alternatively, the response may include information associated with the one or more input values (e.g., when the response includes an altered version of the one or more input values), and security device 240 may determine the input values based on the information associated with the one or more input values. In some implementations, security device 240 may determine the one or more input values based on other information received from server device 230. For example, security device 240 may send a query, requesting the one or more input values, to server device 230, and security device 240 may determine the one or more input values based on a result, received from server device 230, associated with the query.

In some implementations, security device 240 may determine the one or more input values by performing an operation (e.g., executing program code, etc.) that is configured to determine the input values. For example, security device 240 may execute a program code that is configured to identify one or more parameters (e.g., included in a URL associated with the request and/or the response), and security device 240 may determine the one or more input values based on a result associated with executing the program code (e.g., when the one or more parameters may include information that identifies the one or more input values).

As further shown in FIG. 6, process 400 may include modifying the response to include information associated with the one or more input values (block 630). For example, security device 240 may modify the response, received from server device 230, to include information associated with the one or more input values determined by security device 240. In some implementations, security device 240 may modify the response when security device 240 determines the one or more input values associated with the request. Additionally, or alternatively, security device 240 may modify the response when security device 240 receives information, indicating that security device 240 may modify the response, from another device (e.g., server device 230).

In some implementations, security device 240 may modify the response by adding the information that identifies the one or more input values to the response. For example, security device 240 may receive a response that includes a resource (e.g., an HTML file) associated with a request, and security device 240 may add information (e.g., one or more strings of text) that identifies each the one or more input values to the resource (e.g., the HTML file will include text that identifies the one or more input values).

In some implementations, security device 240 may add information that identifies each of the one or more input values determined by security device 240. Alternatively, security device 240 may add information that identifies a portion of the one or more input values (e.g., security device 240 may add information that identifies a first set of input values, of the one or more input values, and may not add information that identifies a second set of input values, of the one or more input values).

In some implementations, security device 240 may modify the response to include the information that identifies the one or more input values in a random manner. For example, security device 240 may randomly select a first location (e.g., a first location included in an HTML file), and may add information associated with a first input value based on the randomly selected first location. In this example, security device 240 may randomly select a second location (e.g., a second location included in the HTML file), and may add information associated with a second input value based on the randomly selected second location. Additionally, or alternatively, security device 240 may modify the response to include the information that identifies the one or more input values in a definite manner (e.g., when security device 240 stores information that indicates a location, associated with an HTML file, at which the one or more input values are to be added, etc.).

In some implementations, security device 240 may modify the response to include the information that identifies the one or more input values by adding information that matches the input values (e.g., security device 240 may add the one or more input values as provided by attacker device 210).

In some implementations, security device 240 may modify the response to include the information that identifies the one or more input values by adding information that does not match the input values. For example, security device 240 may determine an input value (e.g., an input value associated with embedding a script into an HTML file, etc.), and may modify the response to include information that identifies the input value (e.g., information that identifies the input value associated with embedding the script into the HTML file), but does not match the input value (e.g., by removing one or more characters associated with executing the script, by swapping characters, etc.). In this way, security device 240 may modify the response to include information that identifies the one or more input values, but may not allow attacker device 210 to exploit the reflected input value (e.g., security device 240 may prevent attacker device 210 from embedding the script).

In some implementations, security device 240 may modify the response to include sanitized information (e.g., information that cannot be exploited by attacker device 210) that identifies the one or more input values (e.g., security device 240 may generate the sanitized information by performing an operation that is configured to sanitize the information that identifies the one or more input values). For example, security device 240 may execute a program code that is configured to remove one or more characters (e.g., <, >, ", etc.) from the one or more input values, and security device 240 may modify the response to include the sanitized information associated with the one or more input values. As another example, security device 240 may sanitize an injected input value (e.g., an input value that includes a script) by wrapping the input value in an HTML tag (e.g., a multiline text tag, a preformatted text tag, a comment tag, etc.) that may not allow the input value to be exploited by attacker device 210 (e.g., when wrapping the script inside the HTML tag may not allow the script to execute, etc.).

As further shown in FIG. 6, process 400 may include providing the modified response (block 640). For example, security device 240 may provide the modified response to attacker device 210. In some implementations, security device 240 may provide the modified response when security device 240 modifies the response to include the information associated with the one or more input values associated with the request. Additionally, or alternatively, security device 240 may provide the response when security device 240 receives information, indicating that security device 240 may provide the response, from another device (e.g., server device 230, attacker device 210, etc.).

In some implementations, security device 240 may provide the modified response to attacker device 210 via network 220. In some implementations, security device 240 may provide the modified response without providing information that indicates that security device 240 has modified the response (e.g., attacker device 210 may not be made aware that the response has been modified).

In some implementations, security device 240 may provide the modified response to attacker device 210, and attacker device 210 may be unable to identify a vulnerability associated with server device 230 (e.g., since the response is modified to include information that identifies the one or more input values, attacker device 210 may be unable to determine which of the one or more input values, included in the modified response, identify an actual vulnerability).

Although FIG. 6 shows example blocks of process 600, in some implementations, process 600 may include additional blocks, different blocks, fewer blocks, or differently arranged blocks than those depicted in FIG. 6. Additionally, or alternatively, one or more of the blocks of process 600 may be performed in parallel.

Figure 7A:
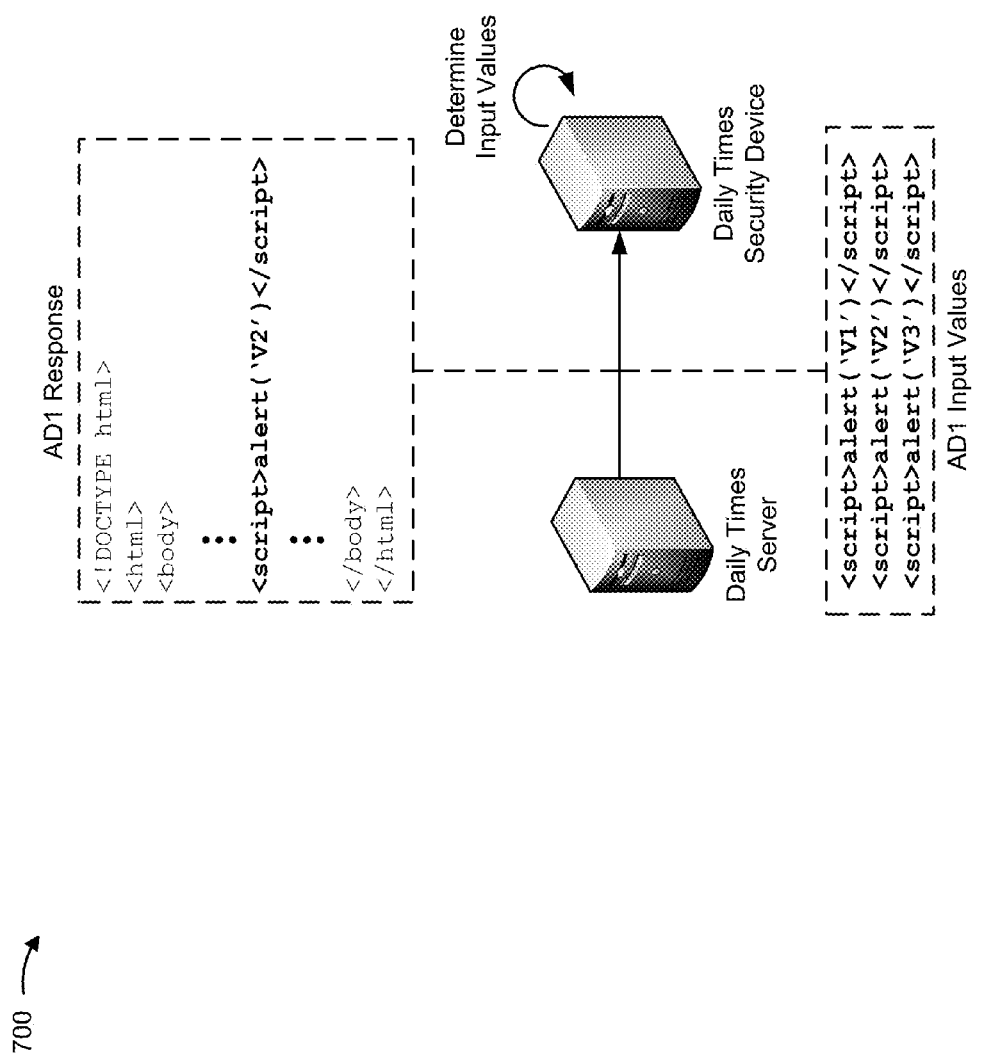
FIGS. 7A-7C are diagrams of an example implementation relating to the example process shown in FIG. 6.
Figure 7B:
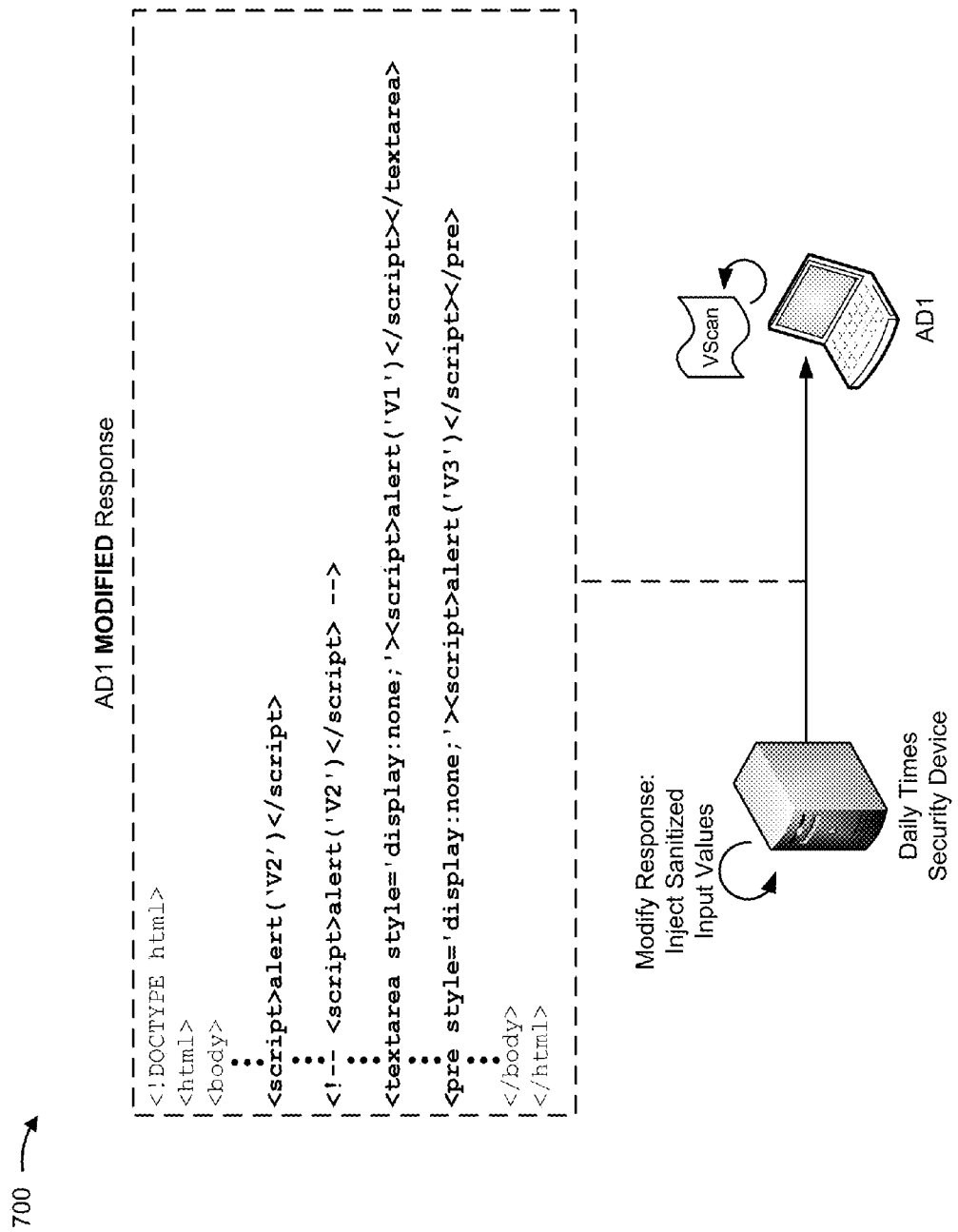
Figure 7C:
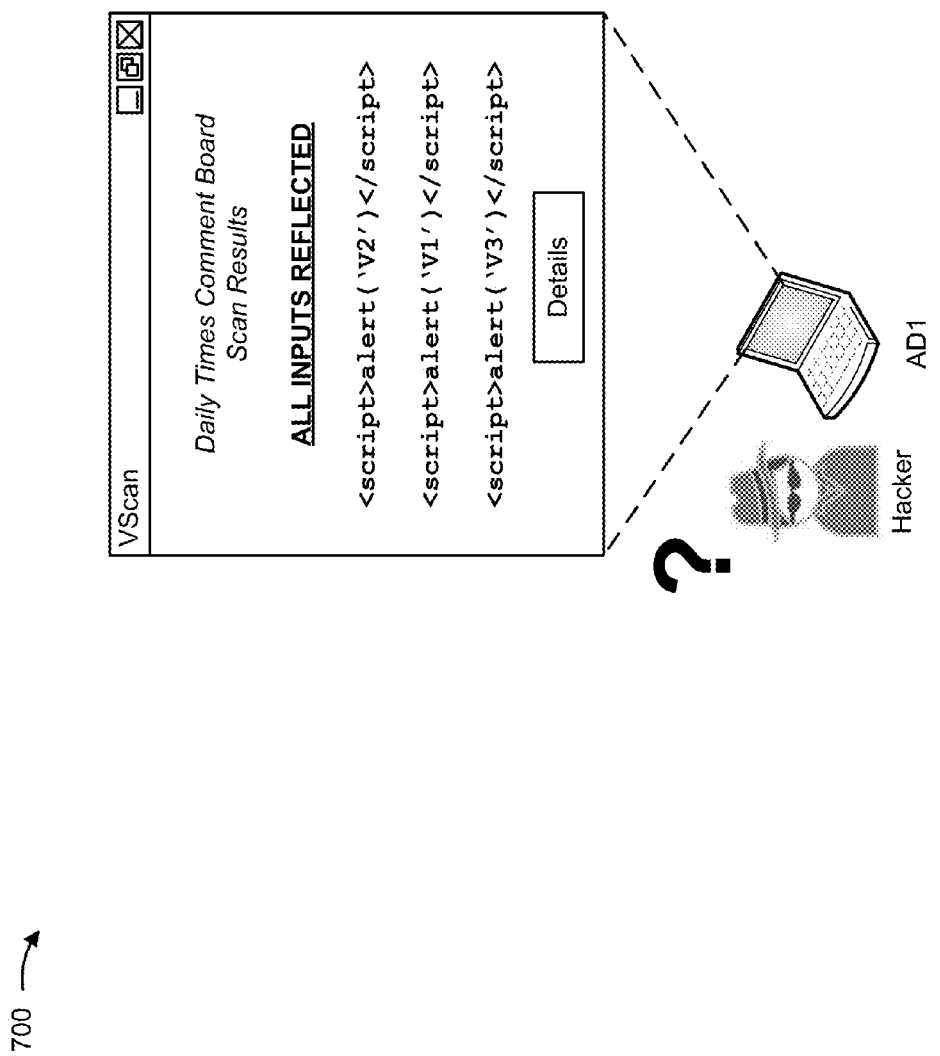

FIGS. 7A-7C are diagrams of an example implementation 700 relating to the example process 600 shown in FIG. 6. For the purposes of example implementation 700, assume that a Daily Times server has generated a response to a request, associated with posting a comment to a Daily Times comment board, and that the response reflects an input value (e.g., "<script>alert ('V2')</script>") that was included in a request provided by an attacker device (e.g., AD1) that wishes to identify one or more vulnerabilities associated with the Daily Times server. Further, assume that a Daily Times security device is configured to modify a response generated by the Daily Times server.

As shown in FIG. 7A, the Daily Times security device may receive the response, associated with the request provided by AD1, from the Daily Times server. As further shown, assume that the Daily Times security device also receives information that identifies the input values associated with the request provided by AD1. As shown, the input values may include, "<script>alert ('V1')</script>," "<script>alert ('V2')</script>," and "<script>alert ('V3')</script>." As further shown, the Daily Times security device may determine the input values based on receiving the information that identifies the input values from AD1.

As shown in FIG. 7B, the Daily Times security device may modify the response, received from the Daily Times server, by injecting sanitized input values into the HTML document included in the response. As shown, the modified response may include information associated with each of the input values provided by the attacker device. In this example, the Daily Times security device may inject the information associated with each of the three input values into the body of the HTML code (e.g., "<script>alert ('V1') </script>," "<script>alert ('V2')</script>," and "<script>alert ('V3')</script>") in a random manner.

As shown, the Daily Times security device may sanitize a first injected input value (e.g., "<script>alert ('V1')</script>") by wrapping the first input value inside an HTML tag that causes the first input value (e.g., the HTML script) to become a string of text that is set to not be displayed (e.g., "<textarea style='display:none;'><script>alert ('V1')</script></textarea>"). Similarly, the Daily Times security device may sanitize a second injected input value (e.g., "<script>alert ('V2')</script>") by wrapping the second input value inside an HTML tag that causes the second input value (e.g., the HTML script) to become a comment that will not be displayed (e.g., "<!--<script>alert ('V2') </script>-->"). Finally, the Daily Times security device may sanitize a third injected input value (e.g., "<script>alert ('V3')</script>") by wrapping the third input value inside an HTML tag that causes the third input value (e.g., the HTML script) to become a block of preformatted text that is set not to be displayed (e.g., "<pre style='display: none;'><script>alert ('V3')</script></pre>"). In this way, the Daily Times security device may inject, into the response, information associated with each of the three input values in a way such that that the reflected input values may not be exploited by AD1. As further shown, the Daily Times security device may provide the modified response to AD1.

As shown in FIG. 7C, AD1 may receive the modified response, and AD1 (e.g., VScan) may display information indicating that each of the three input values, associated with the Daily Times comment board, were reflected in the response received from the Daily Times server. As further shown, the hacker, associated with AD1, may be unable to identify an actual vulnerability included in the Daily Times comment board (e.g., since the hacker will not know which reflected input values indicate false positives).

As indicated above, FIGS. 7A-7C are provided merely as an example. Other examples are possible and may differ from what was described with regard to FIGS. 7A-7C.

Implementations described herein may allow a security device, associated with a server device, to modify a response to include information associated with each of one or more input values provided by an attacker device. In this way, the security device may indicate a vulnerability associated with every input value provided by the attacker device, and a hacker (e.g., associated with the attacker device) may be unable to identify an actual vulnerability (e.g., since the response will include one or more false positives associated with one or more of the input values).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations.

Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A security device, comprising:
    a memory; and
    one or more processors, operatively connected to the memory, to:
        receive, from a server device, a response to a request,
            the request having been provided by an attacker device and including a plurality of input values,
            the response being indicative of a vulnerability associated with the server device based on the response including at least one reflected input value, of the plurality of input values, that is included in the request and reflected by the response;
        select a location within the response;
        modify the response to form a modified response,
            the response being modified by inserting information associated with at least one of the plurality of input values included in the request at the location within the response; and
        provide the modified response to the attacker device.

2. The security device of claim 1, where the one or more processors are further to:
    determine the plurality of input values included in the request based on information received from the server device.

3. The security device of claim 1, where the response is modified in an attempt to prevent the attacker device from identifying the vulnerability associated with the server device.

4. The security device of claim 1, where the one or more processors, when selecting the location, are to:
    randomly select the location within the response.

5. The security device of claim 1, where the one or more processors, when selecting the location, are to:
    select an input value of the plurality of input values; and
    select the location based on information associated with the input value selected.

6. The security device of claim 1, where the one or more processors are further to:
    determine information that matches an input value of the plurality of input values provided by the attacker device; and
    where the one or more processors, when modifying the response, are to:
        modify the response by adding the information that matches the input value.

7. The security device of claim 1, where the one or more processors are further to:
    determine that a first portion of information associated with the plurality of input values is not to be included in the response;
    determine that a second portion of information associated with the plurality of input values is to be included in the response; and
    add the second portion of information to the response,
        the first portion of information not being included in the response.

8. A non-transitory computer-readable medium storing instructions, the instructions comprising:
    one or more instructions that, when executed by one or more processors, cause the one or more processors to:
        receive, from a server device, a response to a request,
            the request having been provided by an attacker device and including a plurality of input values,
            the response being indicative of a vulnerability associated with the server device based on the response including at least one reflected input value, of the plurality of input values, that is included in the request and reflected by the response;
        select a location within the response;
        modify the response to form a modified response,
            the response being modified by inserting information associated with at least one of the plurality of input values included in the request at the location within the response; and
        provide the modified response to the attacker device.

9. The non-transitory computer-readable medium of claim 8, where the one or more instructions, when executed by the one or more processors, cause the one or more processors to:
    determine the plurality of input values included in the request based on information received from the server device.

10. The non-transitory computer-readable medium of claim 8, where the response is modified in an attempt to prevent the attacker device from identifying the vulnerability associated with the server device.

11. The non-transitory computer-readable medium of claim 8, where the one or more instructions, that cause the one or more processors to select the location, cause the one or more processors to:
    randomly select the location within the response.

12. The non-transitory computer-readable medium of claim 8, where the one or more instructions, that cause the one or more processors to select the location, cause the one or more processors to:
    select an input value of the plurality of input values; and
    select the location based on information associated with the input value selected.

13. The non-transitory computer-readable medium of claim 8, where the one or more instructions, when executed by the one or more processors, cause the one or more processors to:
    determine information that matches an input value of the plurality of input values provided by the attacker device; and
    where the one or more instructions, that cause the one or more processors to modify the response, cause the one or more processors to:

modify the response by adding the information that matches the input value.

14. The non-transitory computer-readable medium of claim 8, where the one or more instructions, when executed by the one or more processors, cause the one or more processors to:
    determine that a first portion of information associated with the plurality of input values is not to be included in the response;
    determine that a second portion of information associated with the plurality of input values is to be included in the response; and
    add the second portion of information to the response, the first portion of information not being included in the response.

15. A method, comprising:
    receiving, by a security device and from a server device, a response to a request,
        the request having been provided by an attacker device and including a plurality of input values,
        the response being indicative of a vulnerability associated with the server device based on the response including at least one reflected input value, of the plurality of input values, that is included in the request and reflected by the response;
    selecting, by the security device, a location within the response;
    modifying, by the security device, the response to form a modified response,
        the response being modified by inserting information associated with at least one of the plurality of input values included in the request at the location within the response; and
    providing, by the security device, the modified response to the attacker device.

16. The method of claim 15, further comprising:
    determining the plurality of input values included in the request based on information received from the server device.

17. The method of claim 15, where the response is modified in an attempt to prevent the attacker device from identifying the vulnerability associated with the server device.

18. The method of claim 15, where selecting the location includes:
    randomly selecting the location within the response.

19. The method of claim 15, where selecting the location includes:
    selecting an input value of the plurality of input values; and
    selecting the location based on information associated with the input value selected.

20. The method of claim 15, further comprising:
    determining information that matches an input value of the plurality of input values provided by the attacker device; and
    where modifying the response includes:
        modifying the response by adding the information that matches the input value.

* * * * *